July 20, 1937.    D. W. BUNKER    2,087,241
MACHINE FOR OPERATING ON SHOES
Filed Dec. 23, 1935
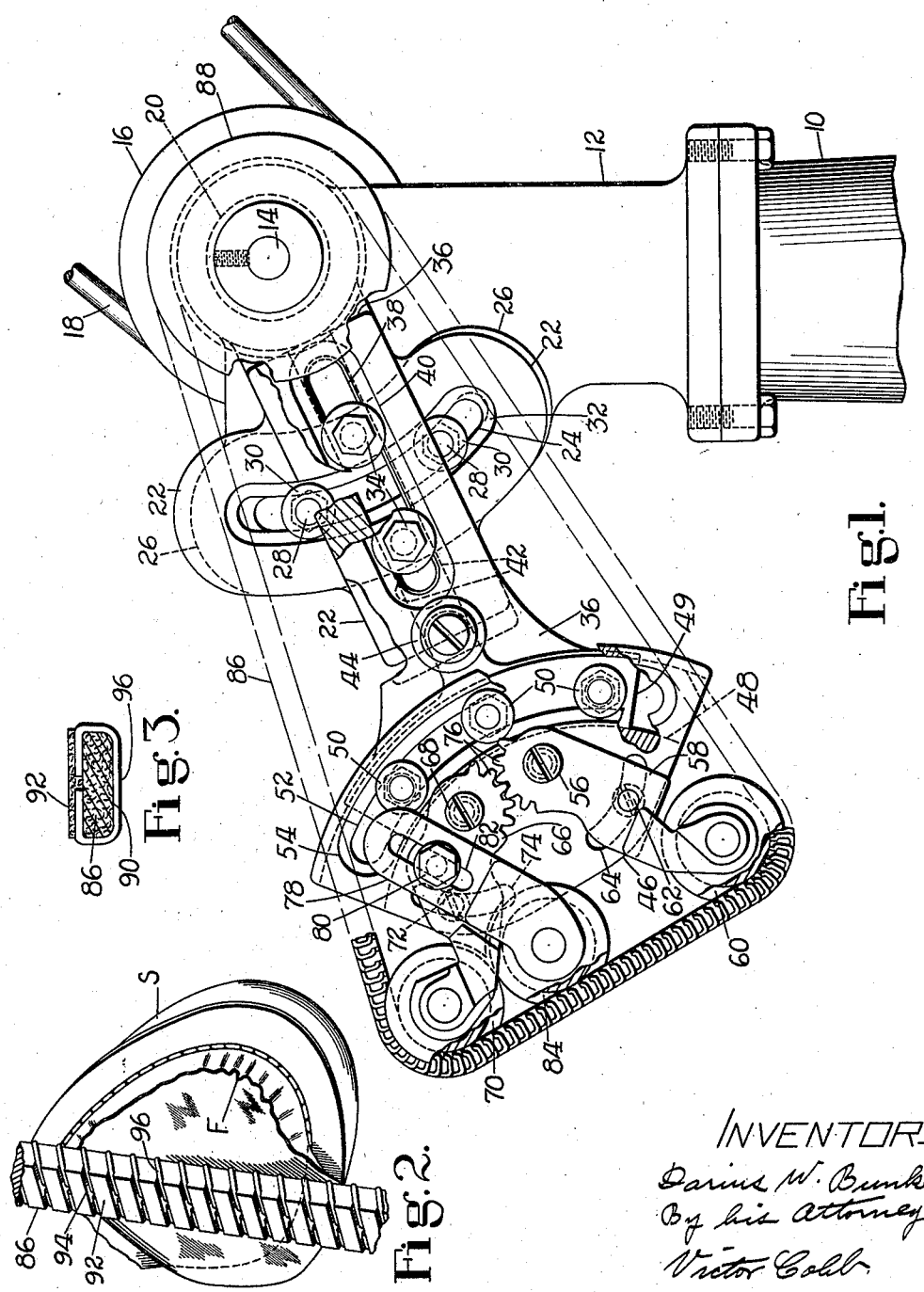

UNITED STATES PATENT OFFICE 2,087,241

MACHINE FOR OPERATING ON SHOES

Darius W. Bunker, Quincy, Mass., assignor to United Shoe Machinery Corporation, Paterson, N. J., a corporation of New Jersey Application December 23, 1935, Serial No. 55,800

9 Claims. (Cl. 12—29)

This invention relates to machines for operating on shoes and is herein illustrated and described as embodied in a machine for performing various operations such as channel-flap-laying, sole-leveling, shank-pounding, side-lasting, and wiping and perfecting the feather line of shoe bottoms. The invention thus contemplates such operations as rubbing, wiping, ironing, leveling, and beating of shoes or of parts which are to be incorporated in shoes. The operating instrumentality of the illustrated machine consists of a driven belt supported for convenient presentation of the work by the operator and having a work-engaging surface adapted to perform its various functions.

It is an object of the invention to provide an improved machine of the character above mentioned. In accordance with a feature of the invention the operating belt is provided with a plurality of work-engaging members raised above the work-engaging surface of the belt and countersunk below the inner surface of the belt so as not to interfere with the bearing of the belt against the various pulleys over which it travels. In accordance with a further feature the belt is supported at its working locality in a path having a predetermined inclination and provision is made for adjusting the supporting means of the belt to accommodate the height of the operator and also for adjusting the inclination of the belt as the operator may desire.

These and other features of the invention will appear more fully from the following detailed description when read in connection with the accompanying drawing and will be pointed out in the appended claims.

Referring now to the accompanying drawing,

Fig. 1 is a view of the improved machine in side elevation omitting the base of the frame;

Fig. 2 is a perspective view illustrating the operation of the machine upon a shoe, and Fig. 3 is a cross-sectional view of the operating belt of the machine.

The supporting structure of the machine consists of a frame or standard 10 adapted to rest upon the floor. Mounted upon the frame 10 is a head 12 in which are formed bearings for a shaft 14. A pulley 16 which is secured to the shaft 14 is driven by a belt 18 from any suitable source of power in a counterclockwise direction as viewed in Fig. 1.

Formed upon the head 12 and concentric with the shaft 14 is a bearing 20 for a bracket 22. Formed in the bracket 22 is an arcuate slot 24 which is concentric with the axis of the shaft 14. Formed upon the head 12 is a bearing surface 26 which engages a similar finished surface upon the bracket 22. A pair of bolts 28 extend through holes in the head 12 and through the slot 24 and are threaded into nuts 30. The slot 24 is countersunk as indicated by the reference character 32 to enable the nuts 30 to lie below the general level of the surface of the bracket 22. The angular position of the bracket 22 about the axis of the shaft 14 may be varied by loosening the bolts 28, swinging the bracket to the desired position, and then tightening the bolts 28.

Secured to the bracket 22 by a pair of bolts 34 is a second bracket 36. The bolts 34 extend through a slot 38 formed in the bracket 36 and are threaded into the bracket 22. The slot 38 is countersunk, as indicated by the reference character 40, to accommodate the heads of the bolts 34. Formed upon the bracket 22 is a guide tongue and formed in the bracket 36 is a corresponding recess, both the tongue and the recess being indicated by the reference character 42. The guide tongue on the bracket 22 is interrupted by the slot 24; the recess in the bracket 36 is, however, continuous and bridges the slot 24. Both the slot 38 and the tongue and recess 42 are radial with respect to the axis of the shaft 14. The tongue and recess 42 constitute a sliding connection to provide for radial adjustment of the bracket 36, the bolts 34 serving to clamp the bracket 36 in any desired position of radial adjustment. Secured upon the bracket 36 is a handle 44 to facilitate both the angular adjustment of the bracket 22 and the radial adjustment of the bracket 36.

Mounted upon the outer end of the bracket 36 is a third bracket 46. Formed in the bracket 46 is an arcuate recess 48 which slidably engages a corresponding arcuate portion 49 formed on the bracket 36. The bracket 46 is secured to the bracket 36 by three bolts 50 which extend through an arcuate slot 52 formed in the bracket 46 and which are threaded into the bracket 36. The slot 52 is concentric with the arcuate recess 48 and is countersunk as indicated by the reference numeral 54 to accommodate the heads of the bolts 50.

Pivotally mounted on a pin 56 which is secured in the bracket 46 is an arm 58 carrying at its outer end a pulley 60. A bolt 62 extending through an arcuate slot 64 formed in the bracket 46 and concentric with the pin 56 is threaded into the arm 58 and thus provides for securing the arm 58 in a desired position of angular adjustment about the pin 56. A similar arm 66 is pivotally mounted upon a pin 68 secured in the bracket 46 and carries at its outer end a pulley 70. The arm 66 is secured in a desired position of angular adjustment about the pin 68 by a bolt 72 passing through an arcuate slot 74 in the bracket 46 and threaded into the arm 66, the slot 74 being concentric with the pin 68. The inner ends of the arms 58 and 66 constitute a pair of intermeshing gear segments 76 to coordinate the angular adjustment of the arms 58 and 66 about the common center line of the pulleys, i. e. about the perpendicular bisector of the line joining the centers of the pulleys. The common center line of the pulleys is stationary, inasmuch as it is also the common center line of the stationary pins 56 and 68. An arm 78 is secured to the arm 66 by a bolt 80 which passes through a longitudinal slot 82 formed in the arm 78 and which is threaded into the arm 66. The arm 78 is slidably guided in the arm 66 in the direction of the slot 82, and can be secured in any desired position of longitudinal adjustment by the bolt 80. Carried upon the outer end of the arm 78 is a pulley 84.

A belt 86 passes over the pulleys 60, 70, and 84 and also over a pulley 88 mounted upon the shaft 14. The center of the arcuate guide recess 48 is substantially midway between the centers of the pulleys 60 and 70, so that the tension of the belt will not be affected by the angular adjustment of the bracket 46. The belt 86, in the illustrated machine, consists of rubberized fabric, although leather may also be used as an alternative. As shown in Fig. 3, the outer or working surface 90 of the belt 86 has its lateral edges somewhat rounded. The belt 86 has an inner surface 92 in which are formed a plurality of parallel diagonal grooves 94 (Fig. 2). A plurality of metal flap-laying members 96 extend diagonally across the working surface of the belt and have their end portions hooked around the lateral edges of the belt. Fig. 3 is a cross-sectional view of the belt taken diagonally along one of the grooves. In the illustrated construction these channel-laying members consist of belt hooks such as are ordinarily used for securing together the ends of a belt. Each of the belt hooks 96 has both of its end portions extending into one of the grooves 94. The belt hooks 96, as they extend across the working surface of the belt and over the edges of the belt, rest upon the surface of the belt and thus constitute work-engaging elements which are raised above the working surface of the belt. However, the ends of the belt hooks extending into the grooves 94 are countersunk below the inner surface of the belt and therefore do not in any way interfere with the bearing of the belt against the various pulleys over which the belt travels and particularly the driving pulley 88. As shown in Fig. 2, the work-engaging surfaces of the belt hooks are without sharp edges and are also smooth in all other respects.

Fig. 2 illustrates the use of the machine in laying a channel flap F of a shoe S. The shoe is held by hand and the channel flap presented to the belt 86 at that portion of the belt which overlies one of the pulleys 60, 70, or 84, or to a portion of the belt between two of said pulleys in cases where positive pressure is not desired, the degree of pressure to be exerted depending upon the stiffness of the flap. In view of the fact that the work is pressed by hand it is important to adjust the machine in such a manner as to bring the working locality of the belt at a level convenient to the height of the operator. This is accomplished by angularly adjusting the bracket 22 about the axis of the shaft 14 in the manner already described. It may often be the case that after such adjustment has been effected the inclination of the belt 86 at its working locality is not convenient to the operator. Moreover, it has been observed that different operators, even of the same height, may prefer different inclinations of the belt because of the different postures which they naturally assume while holding the work in engagement with the belt. The provision, which has already been described, for the angular adjustment of the bracket 46 enables the belt 86 at its working locality to be maintained at a desired inclination regardless of heightwise adjustment, and it likewise enables the inclination to be varied for any particular heightwise adjustment.

The operations of sole-leveling and of shank-pounding are performed in a manner similar to that of channel-flap-laying. In cases where a heavy positive pressure is required the backing afforded by the roll 84 is utilized. However, in cases wherein the shoe bottoms, and particularly the shank portions thereof, present a considerable degree of convex curvature the arm 78 and with it the roll 84 are removed from the machine. This enables the belt 86 to sag under the pressure applied by the operator and thus to follow up the curvature of the shoe bottom. The amount of slack in the belt 86 is regulated by the radial adjustment, already described, of the bracket 36. The shape assumed by the belt 86 depends not only upon the amount of slack but also upon the distance between the supporting pulleys 60 and 70. This distance may be varied by loosening the nuts 62 and 72, swinging the arms 58 and 66 about their respective pivots until the desired adjustment has been effected, and then tightening the bolts. The geared sectors 76, by coordinating the movements of the pulleys 60 and 70, causing the pulleys each to partake equally of the adjustment, insure that the angle of inclination of the belt at its working locality will not be varied by such adjustment. When the pulleys 60 and 70 are adjusted relatively close together, the belt 86 is enabled partially to wrap itself about a work piece, and thus operates effectively upon rounded shanks. The machine may also be used in this manner for side-lasting, particularly in the case of cemented shoes, and for wiping and perfecting the feather line of the shoe bottom.

Having thus described my invention, what I claim as new and desire to secure by Letters Patent of the United States is:

1. A tool for operating upon shoes comprising a belt having an outer or working surface and an inner surface adapted to engage one or more driving and supporting pulleys, and a plurality of smooth wiping and pressing members raised above the working surface of said belt and countersunk below the inner surface of said belt.

2. A tool for operating upon shoes comprising a belt having an outer or working surface and an inner surface adapted to engage one or more driving and supporting pulleys, and a plurality of elongated metal work-engaging members, each of said work-engaging members having its two end portions countersunk below the inner surface of said belt and having its intermediate portion extending across and raised above the working surface of the belt.

3. A tool for operating upon shoes comprising a belt having an outer or working surface and an inner surface adapted to engage one or more driving and supporting pulleys, said belt having a plurality of diagonal grooves extending across its inner surface, and a plurality of metal wiping and pressing members extending diagonally across the working surface of said belt, each of said wiping and pressing members having its end portions hooked over the lateral edges of said belt and extending into one of said grooves.

4. A machine for operating on shoe bottoms comprising a driven member adapted to lay a channel flap, a support for said flap-laying member, a bracket upon which said support is mounted for angular adjustment about an axis in proximity to the locality of operation to vary the direction of the path of action of the flap-laying member, and pivotal means for supporting said bracket for adjustment about an axis remote from the locality of operation to enable the locality of operation to be varied.

5. A machine for operating on shoe bottoms comprising a continuous driven member adapted to lay a channel flap, a drive pulley for said flap-laying member, means additional to and cooperating with said drive pulley for supporting said flap-laying member, and a bracket upon which are carried said additional supporting means, said bracket being mounted for pivotal adjustment about the axis of said drive pulley to vary the position of the flap-laying member at the locality of operation.

6. A machine for operating on shoe bottoms comprising a belt having an operating surface adapted to lay a channel flap, a drive pulley for said belt, a pair of supporting pulleys for said belt, a frame upon which said supporting pulleys are mounted, a bracket upon which said frame is mounted for angular adjustment to vary the direction of the path of said belt between said supporting pulleys, and means for supporting said bracket for pivotal adjustment about the axis of said drive pulley to vary the position of said supporting pulleys.

7. A machine for operating on shoe bottoms comprising a belt having an operating surface adapted to lay a channel flap, means for supporting said belt at its working locality in a path having a predetermined inclination, and a bracket for carrying said belt-supporting means, said bracket being constructed and arranged for heightwise adjustment of said belt-supporting means and said belt-supporting means being constructed and arranged for adjustment of the inclination of the path of said belt.

8. A machine for operating on shoes, comprising a belt adapted to operate on shoes, a pair of pulleys for supporting said belt, a pivotally-mounted arm for supporting each of said pulleys, each arm having formed on it a gear segment which meshes with the segment on the other arm to coordinate the positions of said pulleys with reference to their common center line, and means for securing said arms in adjusted position.

9. A channel-flap laying and sole-leveling machine comprising a driven belt adapted to exert a wiping and pressing action upon a sole, a pair of pulleys for supporting said belt at its locality of operation, a support for said pulleys adjustable to vary the inclination of the line joining the centers of said pulleys, and connections between said pulleys and said support constructed and arranged for adjustment of the distance between said pulleys while maintaining substantially constant the inclination of the line joining the centers of said pulleys.

DARIUS W. BUNKER.